United States Patent
Mori et al.

(10) Patent No.: US 7,634,538 B2
(45) Date of Patent: Dec. 15, 2009

(54) PRODUCT COUNSELING SYSTEM, PRODUCT DEVELOPMENT PROGRAM, AND MACHINE-READABLE RECORDING MEDIUM

(75) Inventors: Shigeru Mori, Tokyo (JP); Takashi Satoh, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 688 days.

(21) Appl. No.: 10/241,227

(22) Filed: Sep. 11, 2002

(65) Prior Publication Data

US 2003/0078971 A1 Apr. 24, 2003

(30) Foreign Application Priority Data

Sep. 13, 2001 (JP) ............................. 2001-278323

(51) Int. Cl.
G06F 15/16 (2006.01)
G06F 17/30 (2006.01)

(52) U.S. Cl. ..................................... 709/204; 705/27

(58) Field of Classification Search ................ 709/204; 707/1, 102; 705/26, 10, 27
See application file for complete search history.

(56) References Cited

U.S. PATENT DOCUMENTS

| | | | | |
|---|---|---|---|---|
| 5,278,751 A * | 1/1994 | Adiano et al. | ............... | 705/10 |
| 5,819,273 A * | 10/1998 | Vora et al. | ............... | 707/10 |
| 5,875,108 A * | 2/1999 | Hoffberg et al. | ............. | 700/17 |
| 5,938,593 A * | 8/1999 | Ouellette | .................... | 600/300 |
| 5,983,220 A * | 11/1999 | Schmitt | ...................... | 707/5 |
| 6,236,990 B1 * | 5/2001 | Geller et al. | ................. | 707/5 |
| 6,505,168 B1 * | 1/2003 | Rothman et al. | ............. | 705/10 |
| 6,738,931 B1 * | 5/2004 | Osborn et al. | ............... | 714/37 |
| 7,246,087 B1 * | 7/2007 | Ruppelt et al. | ............... | 705/27 |
| 2001/0042002 A1 * | 11/2001 | Koopersmith | ............... | 705/10 |
| 2002/0007294 A1 * | 1/2002 | Bradbury et al. | .............. | 705/7 |
| 2002/0065456 A1 * | 5/2002 | Bazin et al. | ................. | 600/407 |
| 2002/0120491 A1 * | 8/2002 | Nelson | ........................ | 705/10 |
| 2002/0133502 A1 * | 9/2002 | Rosenthal et al. | ........ | 707/104.1 |
| 2003/0013994 A1 * | 1/2003 | Rubinstenn et al. | ......... | 600/587 |
| 2003/0014324 A1 * | 1/2003 | Donovan et al. | .............. | 705/26 |

FOREIGN PATENT DOCUMENTS

JP 2000126439 5/2000

* cited by examiner

Primary Examiner—Nathan J Flynn
Assistant Examiner—Chirag R Patel
(74) Attorney, Agent, or Firm—Ladas & Parry LLP

(57) ABSTRACT

The present invention is a cosmetic product counseling system in which a user terminal is provided with skin diagnostic equipment for measurement of the skin of customers. Cosmetic products suited for the customers are selected based on skin condition data obtained from the skin diagnostic equipment before selecting a cosmetic product and attribute data entered from the user terminal which are in the server. A product selection DB is provided in which product matrices linking each item contained in the skin condition data and product characteristics of the cosmetics are stored. Then, based on result skin condition data indicating skin condition of the customer after using the selected cosmetic product and usage evaluation data entered by the customer responding to a questionnaire, the cosmetic product is reselected until a predetermined satisfaction rating is obtained from the customer.

4 Claims, 9 Drawing Sheets

FIG.4

PLEASE COMPLETE THE FOLLOWING ITEMS:

1. PLEASE INPUT NAME OF THE MEMBER

2. PLEASE INPUT DATE OF BIRTH OF THE MEMBER
   Y ☐ M ☐ D

3. PLEASE INPUT ADDRESS OF THE MEMBER

4. PLEASE INPUT ATTRIBUTE OF THE MEMBER
   ○MALE ○FEMALE ○MRS ○MISS
   OCCUPATION

5. OTHERS

| HOBBY | SKIN TROUBLES Y/N | REQUIREMENTS FOR SKIN |

FIG.5

PLEASE ANSWER THE QUESTIONNAIRE:

| | | EVALUATION OF PRODUCT |
|---|---|---|
| 1 | FEEL | BAD —— SLIGHTLY BAD —— NO CHANGE —— SLIGHTLY GOOD ↞ —— GOOD |
| 2 | ABSORPTION INTO SKIN | SLOW —— SLIGHTLY SLOW —— NO CHANGE —— SLIGHTLY QUICK —— QUICK |
| 3 | SLIMINESS WHEN APPLIED TO SKIN | YES —— SLIGHTLY YES —— NO CHANGE —— SLIGHTLY NO —— NO |
| 4 | THICKNESS WHEN APPLIED TO SKIN | NO —— SLIGHTLY NO —— NO CHANGE —— SLIGHTLY YES —— YES |
| 5 | STICKINESS DIRECTLY AFTER APPLICATION | YES —— SLIGHTLY YES —— NO CHANGE —— SLIGHTLY NO —— NO |

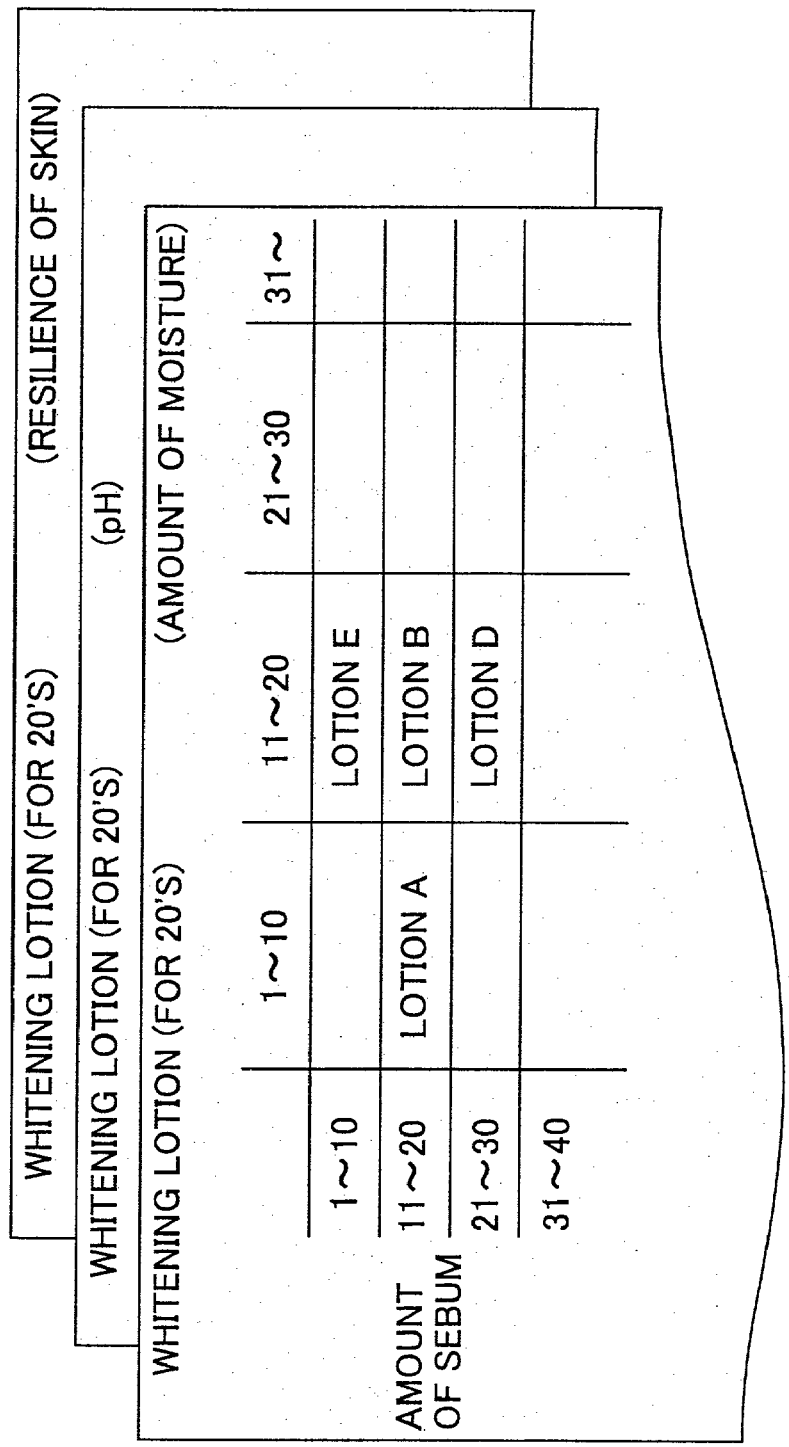

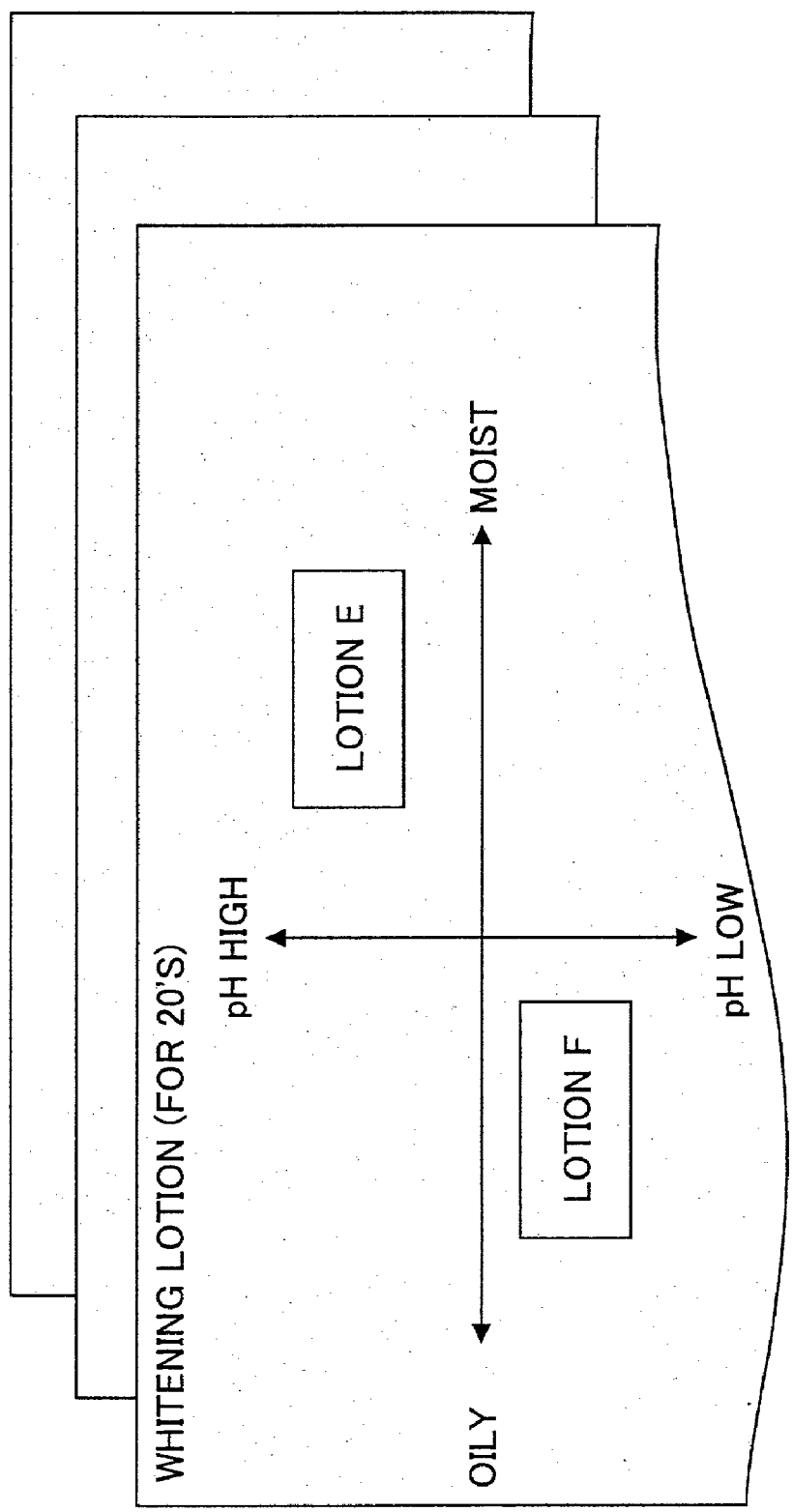

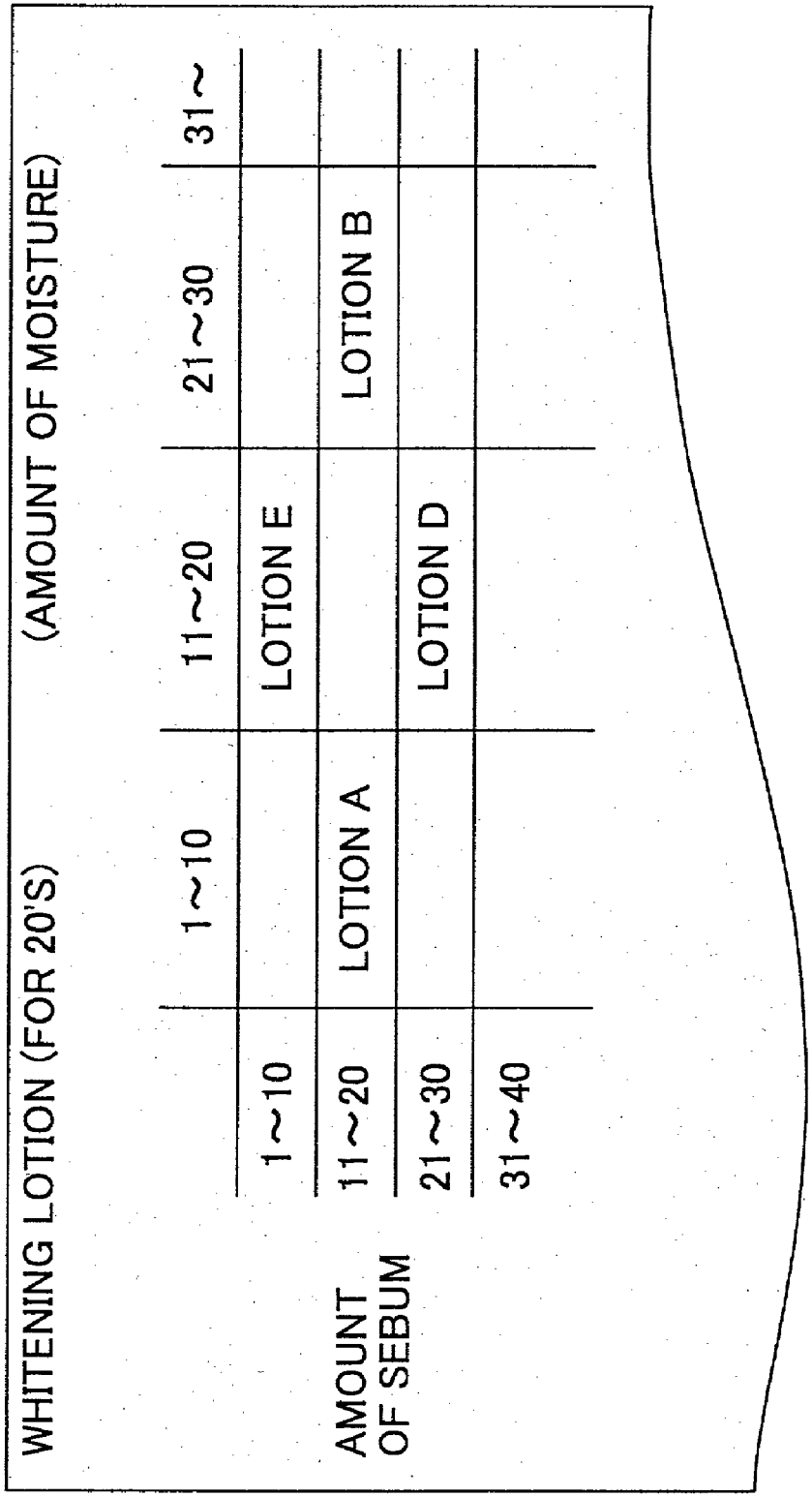

US 7,634,538 B2

PRODUCT COUNSELING SYSTEM, PRODUCT DEVELOPMENT PROGRAM, AND MACHINE-READABLE RECORDING MEDIUM

BACKGROUND OF THE INVENTION

The present invention relates to a counseling system of products or merchandise and a product development program and more particularly to a counseling system of products or merchandise for giving counseling to the customer for a cosmetic product that suits her/him based on product data stored in a server and to a product development program.

A sales strategy is known, for example, in which a beauty assistant at a store observes the customer's skin or other parts to give counseling and selects the most suitable cosmetic product for the customer. In accordance with such a sales strategy, it is the beauty assistant who is a trained specialist that observes the skin condition of the customer and selects the most suitable cosmetic product for the customer, and therefore, the cosmetic product that satisfies the customer can be selected.

Further, the beauty assistant holds a conversation with the customer to obtain information related to images and characteristics (for example, fragrance and feel upon application to skin) of a cosmetic product that the customer requires and this information is also used as one of the criteria for selecting a cosmetic product. Thus, a cosmetic product that gives a sufficient level of satisfaction rating to the customer can be selected.

On the other hand, for a manufacturer of cosmetic products, information on the use of the product is very important in developing new products. Therefore, conventionally, evaluation of the use of a cosmetic product is carried out.

Conventionally, a method of evaluating the use of a cosmetic product is known in which people who evaluate the cosmetic product are hired in advance or monitors selected from the general public are recruited (hereinafter, these people are referred to as panelists), and then the cosmetic product to be evaluated is actually used by the panelists in order that the panelists can evaluate the use of the cosmetic product. In the use evaluation method described above, evaluation of the use is normally a satisfaction rating evaluation in which satisfaction is expressed in several grades from "very good" to "very bad".

However, as for the method in which a cosmetic product is selected in accordance with the result of counseling given by the beauty assistant, the content of counseling may vary due to factors such as how experienced is the beauty assistant. Therefore, there is a problem that levels of counseling may be different between individual beauty assistants.

Also, according to the conventional method, the customer must actually to go to a store to receive counseling, so that it may bother the customer and lead to the customer making her/his own decision and purchasing cosmetic products that are not actually suited to her/his skin. In such a case, it is difficult to acquire the skin condition required by the customer, since the cosmetic products are not suited to her/his skin and the customer is not aware of this fact.

On the other hand, according to the conventional usage evaluation method mentioned above, a considerable number of panelists are necessary for an accurate evaluation. In other words, in order to improve reliability and validity of usage evaluation, it is necessary to have a considerable number of panelists to make evaluations such that there are no biases between characteristics and attributes of the panelists. However, there is a problem that in practice it is difficult to have these panelists available.

SUMMARY OF THE INVENTION

Accordingly, it is an object of the present invention to provide a counseling system of products or merchandise and a product development program for appropriate counseling for a customer and for assisting in developing new products that meet the customer's needs, and, a machine-readable recording medium storing such a program.

In order to achieve the above object, the invention of claim 1 is a product counseling system comprising:

a first terminal for performing various input/output processes for providing product counseling to a customer; and a server connected to said first terminal via a network, said server generating counseling data suited for said customer based on data input from said first terminal and transmitting said counseling data to said first terminal, wherein said first terminal is provided with a condition input means for inputting conditions of a portion of said customer whereon a product is to be used; and said server is provided with first selecting means for selecting a product suited for said customer based on condition data before product selection that is obtained from said condition input means and attribute data input from said first terminal.

Also, the invention of claim 2 is the product counseling system as claimed in claim 1, wherein said server is provided with:

a product selection data base in which product matrices that link values of each item contained in said condition data and product characteristics of products are stored; and second selecting means that refers to the condition data obtained from said condition input means and usage evaluation data of said selected data input from said first terminal and, in a case where satisfaction rating of said customer after using the selected product selected by said first selection means is less than or equal to a predetermined value, reselects a product by referring to said product selection database.

According to the above inventions, data of the condition (condition data) of a portion of the customer (e.g. skin) whereon a product is to be used that is input by the condition input means of the first terminal is sent to the server. The first selection means provided in the server selects a product suited to the customer based on the transmitted condition data and the attribute data input from the first terminal. Then, the customer uses the selected product. It is to be noted that the attribute data input from the first terminal is data related to the customer's favorite fragrance and mainly a feel of use of the product such as a feel when applied to skin.

After the product selected by the first selection means (selected product) is used for a predetermined period of time, condition data of the portion of the customer whereon the selected product is used (hereinafter referred to as result condition data) is input from the condition input means. Also, at the same time, from the first terminal, the customer inputs usage evaluation data of the selected product. Here, the usage evaluation data of the selected product is data mainly related to a feel of use of the selected product such as "absorption into skin" and "stickiness".

When the satisfaction rating of the customer for the selected product is less than or equal to a predetermined value, the second selection means provided in the server reselects a product by referring to the product selection database based on said condition data and the usage evaluation data. This reselection process is repeated until the satisfaction rating of the customer for the selected product becomes greater than or equal to the predetermined value. It is to be noted that, here, the product selection database is to be understood as a database in which product matrices linking values of each item contained in the condition data and product characteristics of the products are stored.

Thus, by providing the second selection means, when the satisfaction rating of the customer is less than or equal to the predetermined value, a product that more nearly matches the customer's requirements is selected. Also, reselection of the product is performed based on the condition data after usage of the selected product that is input from the condition input means. Therefore, it is possible to accurately and readily perform counseling for selecting a product that reflects the current condition data of the customer and satisfies the satisfaction rating of the customer.

Also, the invention of claim 3 is the product counseling system as claimed in claim 2, wherein said server is provided with:

storage means for storing said condition data and said usage evaluation data in a linked manner; and correction means for correcting said product matrix stored in said product selection database based on said condition data and said usage evaluation data stored in said storage means when a number of data stored in said storage means reaches a predetermined number.

According to the invention described above, since storage means for storing said condition data and said usage evaluation data in a linked manner is provided and correction means is provided for correcting said product matrices stored in said product selection database based on said condition data and said usage evaluation data stored in said storage means when the number of data records stored in said storage means reaches a predetermined number, the product satisfaction rating of the customer can always be input into the product matrices and therefore the accuracy of product selection capability of the product matrices can be improved as the number of data increases.

Also, the invention of claim 4 is the product counseling system as claimed in claim 3, wherein product development-assisting means is provided for developing a product having new characteristics required for a product based on said condition data and said usage evaluation data stored in said storage means when the number of data records stored in said storage means reaches a predetermined number.

According to the invention described above and the invention described in claim 10, when the number of data records stored in said storage means reaches a predetermined number, product development-assisting means selects a product having characteristics that are not reflected in the product matrices based on condition data and said usage evaluation data stored in said storage means. Here, "being not reflected in the product matrices" is understood to mean that, even if there are needs from the customer, there is no product that meets such needs.

The characteristics that are not reflected in the product matrices can be specified by finding a position in a matrix where satisfaction rating of the customer does not exceed the predetermined satisfaction rating. In other words, "satisfaction rating of the customer does not exceed the predetermined satisfaction rating" is to mean that there is no such product that satisfies the satisfaction rating for the relevant characteristics, and, a process performed by the product development-assisting means for selecting a product having characteristics that are not reflected in the product matrix is equivalent to a process of selecting a product that the customer requires.

Accordingly, the manufacturer that carries out product development can offer products that can obtain a satisfaction rating of the customer by developing products that are selected by the product development-assisting means. In this manner, the manufacturer can improve the existing products and develop new products with reduced time in a precise manner.

Also, the invention claimed in claim 5 is the product counseling system as claimed in claim 2, wherein said condition input means is a skin condition input apparatus for inputting skin condition of the customer.

Also, the invention claimed in claim 6 is the product counseling system as claimed in claim 2, wherein items to be input by said condition input means include at least one of the items selected from skin trough and skin hill on skin surface, amount of moisture, amount of sebum, pH value and resiliency of the skin surface.

According to the inventions above, counseling on the customer's skin can be performed appropriately.

Also, the invention claimed in claim 7 is the product counseling system as claimed in claim 2, wherein said usage evaluation data is generated by said customer responding to a questionnaire.

According to the above invention, since the usage evaluation data is generated by customers responding to a questionnaire, it is easier for the customer to answer the questions and, as for creating usage evaluation data, a process of counting the results can be simplified since the answers from each customer are expressed in a common format.

Also, the invention claimed in claim 8 is the product counseling system as claimed in claim 1, further comprising:

means for generating production adjustment data of the product selected based on a number of customers who give a satisfaction rating greater than or equal to a predetermined value.

According to the invention described above and according to the invention claimed in claim 11, production can be reduced for unpopular cosmetics and increased for popular cosmetics, so as to achieve an efficient supply of cosmetic products on the market and optimization of inventory adjustment.

Also, the invention claimed in claim 9 is the product counseling system as claimed in claim 1, wherein said product is a cosmetic product.

Also, the invention claimed in claim 10 is a product development program for causing a computer to perform product development, comprising:

first selection means for selecting a product suited for said customer based on condition data before product selection obtained from condition input means for inputting condition of a portion of the customer whereon the product is to be used and attributed data;

storage means for storing, in an associated manner, said condition data and said usage evaluation data obtained from said customer after using the selected product; and product development-assisting means for developing a product having new characteristics required for the product based on said condition data and said usage evaluation data stored in said storage means when a number of data records stored in said storage means reaches a predetermined number.

Also, the invention claimed in claim 11 is a product development program for causing a computer to perform product development, comprising:

means for deriving number of customers who give a satisfaction rating greater than or equal to a predetermined value; and means for generating production adjustment data of the product selected based on said number of customers.

Also, the invention claimed in claim 12 is the product development program as claimed in claim 10 or 11, wherein said product is a cosmetic product.

Also, the invention claimed in claim 13 is a computer readable storage medium storing a product development program for causing a computer to perform product development, said program comprising:

first selection means for selecting a product suited for said customer based on condition data before product selection obtained from condition input means for inputting condition of a portion of the customer whereon the product is to be used and attributed data;

storage means for storing, in an associated manner, said condition data and said usage evaluation data obtained from said customer after using the selected product; and product development-assisting means for developing a product having new characteristics required for the product based on said condition data and said usage evaluation data stored in said storage means when a number of data records stored in said storage means reaches a predetermined number.

Also, the invention claimed in claim 14 is a computer readable storage medium storing a product development program for causing a computer to perform product development, said program comprising:

means for deriving a number of customers who give a satisfaction rating greater than or equal to a predetermined value; and means for generating production adjustment data of the product selected based on said number of customers.

Also, the invention claimed in claim 15 is the computer readable storage medium storing a product development program as claimed in claim 13 or 14, wherein said product is a cosmetic product.

BRIEF DESCRIPTION OF THE DRAWINGS

FIG. 4 is a diagram showing an example of an input screen of attribute data.

FIG. 5 is a diagram showing an example of a response screen for a questionnaire.

FIG. 6 is a diagram showing an example of a product matrix.

FIG. 7 is a diagram showing an example of a product matrix.

FIG. 8 is a diagram for explaining a correction process of a product matrix.

DETAILED DESCRIPTION OF THE PREFERRED EMBODIMENTS

In the following, embodiments of the present invention will be described with reference to the accompanying drawings.

Figure 1:
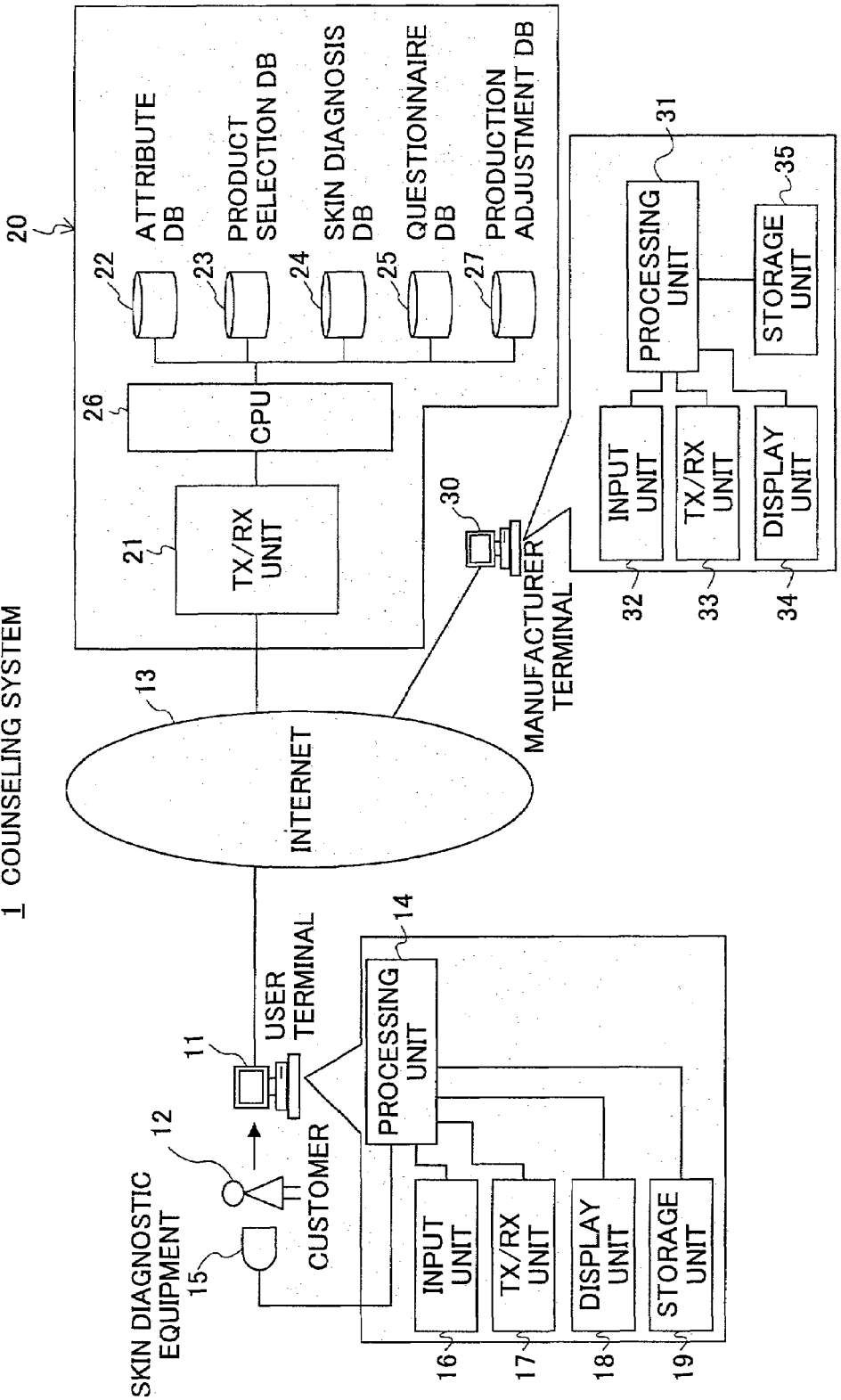
FIG. 1 is an overall configuration diagram of a counseling system of an embodiment of the present invention.

FIG. 1 is a system configuration diagram showing a counseling system 10 of cosmetic products or merchandise of an embodiment of the present invention. As shown in the figure, the counseling system 10 generally includes a user terminal 11, a server 20, a manufacturer terminal 30 and the Internet 13 via which the user terminal 11 and the server 20 are connected.

It is to be noted that the system 10 of the present embodiment is described by taking an example of the Internet 13 being used as a communication network, however, other networks may be used instead of the Internet.

The user terminal 11 is installed in a store that sells cosmetic products or in a house of a customer 12 who purchases products or merchandise. The user terminal 11 includes a processing unit 14, skin diagnostic equipment 15, an input unit 16, a transmitter/receiver unit 17, a display unit 18 and a storage unit 19.

The storage unit 19 stores various programs for carrying out a counseling process described below. The processing unit 14 runs these programs in order to carry out various processes required for counseling. Also, the processing unit 14 has overall control of the output part 15, the input unit 16, the transmitter/receiver unit 17, the display unit 18 and the storage unit 19.

The input unit 16 is a keyboard, for example, and is used for inputting various data required for counseling. The transmitter/receiver unit 17 is a unit that connects the user terminal 11 to the Internet 13. The display unit 18 is, for example, a CRT that displays contents input from the input unit 16 and various information transmitted from the server 20.

Also, in the present embodiment, the skin diagnostic equipment 15 is connected to the processing unit 14. The skin diagnostic equipment 15 serves as condition input means for inputting condition of a part where cosmetic products are to be used on the customer (hereinafter referred to as an imaged part). It is to be noted that in the present embodiment described below, skin is to be described as an example of the imaged part. However, the present invention is not only applicable to skin, but is also applicable to other parts (nails, eyebrows, hair, scalp, lips, etc.)

The skin diagnostic equipment 15 includes solid-state element(s) (CCD) and a probe provided therein such that the imaged part of the customer 12 is optically read by the CCD and the skin condition is physically detected by the probe, so that these are converted into electric signals to produce skin condition data that represents the condition of the skin. As will be described later, the central processing unit 26 provided in the server 20 carries out skin diagnosis of the customer 12 based on the skin condition data transmitted from the user terminal 11 and the skin diagnosis data stored in the skin diagnosis DB 24.

Also, items taken into consideration for skin diagnosis of the embodiments include at least one item selected from skin trough and skin hill on the skin surface, amount of moisture, amount of sebum, pH value and resiliency of the skin surface. The skin diagnostic equipment 15 is also configured such that it is driven under control of the processing unit 14. It is to be noted that, instead of optical reading, a physical input process may be performed using a tool such as a contact probe.

On the other hand, the server 20 includes a central processing unit 26, a transmitter/receiver unit 21, an attribute database (hereinafter abbreviated as DB) 22, a product selection DB 23, a skin diagnosis DB 24, a questionnaire DB 25 and a production adjustment DB 27.

The central processing unit 26 runs various programs described below to perform a questionnaire process, a product matrix-correction process and a product development-assisting process for the customer 12. The central processing unit 26 also receives various information transmitted via the Internet 13 and stores the information in the relevant DBs 22-25.

The attribute DB 22 stores attribute data related to the customer 12. The attribute data may be name, contact address, and various attributes of the user 12. Various attributes may include date of birth, occupation, hobby, problems related to skin and requirements for the skin.

The product selection DB 23 stores an initial product matrix used for selecting cosmetic products for the customer and product matrices. The initial product matrix is a matrix that is referred to when product selection is carried out for the first time by the counseling system 10 of the present invention. The initial product matrix is configured such that cosmetic products suited for the customer 12 can be selected using contents of the attribute data (sex, age, skin troubles and skin conditions, etc.) as parameters.

On the other hand, the product matrices are matrices that are used for selection processes of a cosmetic product for the second time and onwards. FIG. 6 shows an example of the product matrix.

In the product matrix, values of each items contained in the skin condition data are associated with product characteristics of the cosmetic product. The embodiment shown in FIG. 6 relates to a whitening lotion (for customers in their twenties) with the parameters being the amount of sebum and the amount of moisture contained in the skin condition data.

From this product matrix and the skin condition data of the customer 12 diagnosed by the skin diagnostic equipment 15, a cosmetic product suited for the customer 12 can be selected. That is, in a case where the amount of sebum of the customer 12 diagnosed by the skin diagnostic equipment 15 is within the range of 11-20 and the amount of moisture of the customer 12 diagnosed by the skin diagnostic equipment 15 is within the range of 1-10, the product matrix shows that lotion A is the whitening lotion suited for the customer 12 in consideration.

Such product matrices are also prepared for relationships between the amount of sebum and pH and between the amount of sebum and skin resiliency, and as will be described later, the central processing unit 26 selects optimum cosmetic products for the customer 12 by referring to the skin condition of the customer 12 diagnosed by the skin diagnosing apparatus 15 and various product matrices stored in the product selection DB 23. Also, as will be described later, the product matrices can be appropriately corrected on a regular basis such that they always reflect the satisfaction rating of the customers 12 (for convenience's sake of explanation, this will be described later).

The present embodiment is described using an example of a two-dimensional product matrix having two parameters as shown in FIG. 6. However, it is to be noted that the product matrix is not limited to such a structure, but may also be a three-dimensional product matrix (amount of sebum, moisture and pH are the three parameters) as shown in FIG. 7 or further a one-dimensional matrix or a multi-dimensional matrix of more than four dimensions.

The skin diagnosis DB 24 stores skin diagnosis data. The central processing unit 26 of the server 20 carries out skin diagnosis of the customer 12 based on the skin condition data input from the skin diagnostic equipment 15 and the skin diagnosis data stored in the skin diagnosis DB 24. As has been described above, the skin diagnosis items to be diagnosed based on the skin diagnosis data are amount of moisture, amount of sebum, pH value and resiliency of the skin surface.

The questionnaire DB 25 stores questionnaire contents for asking about usage evaluation for a cosmetic product selected by the counseling system 10 of the present invention (hereinafter referred to as a selected cosmetic product) after the customer 12 has actually used the selected cosmetic product.

On the other hand, the manufacturer terminal 30 is a terminal installed at the cosmetics manufacturer that includes a processing unit 31, an input unit 32, a transmitter/receiver unit 33, a display unit 34 and a storage unit 35. The manufacturer terminal 30 is also capable of being connected to the server 20 via the Internet 13.

Further, the production adjustment DB 27, as will be described later, stores data such as satisfaction rating data of the customer 12 for the cosmetic products.

Now, a counseling process and a new product development-assisting process of the counseling system 10 of the above system configuration will be described.

Figure 2:
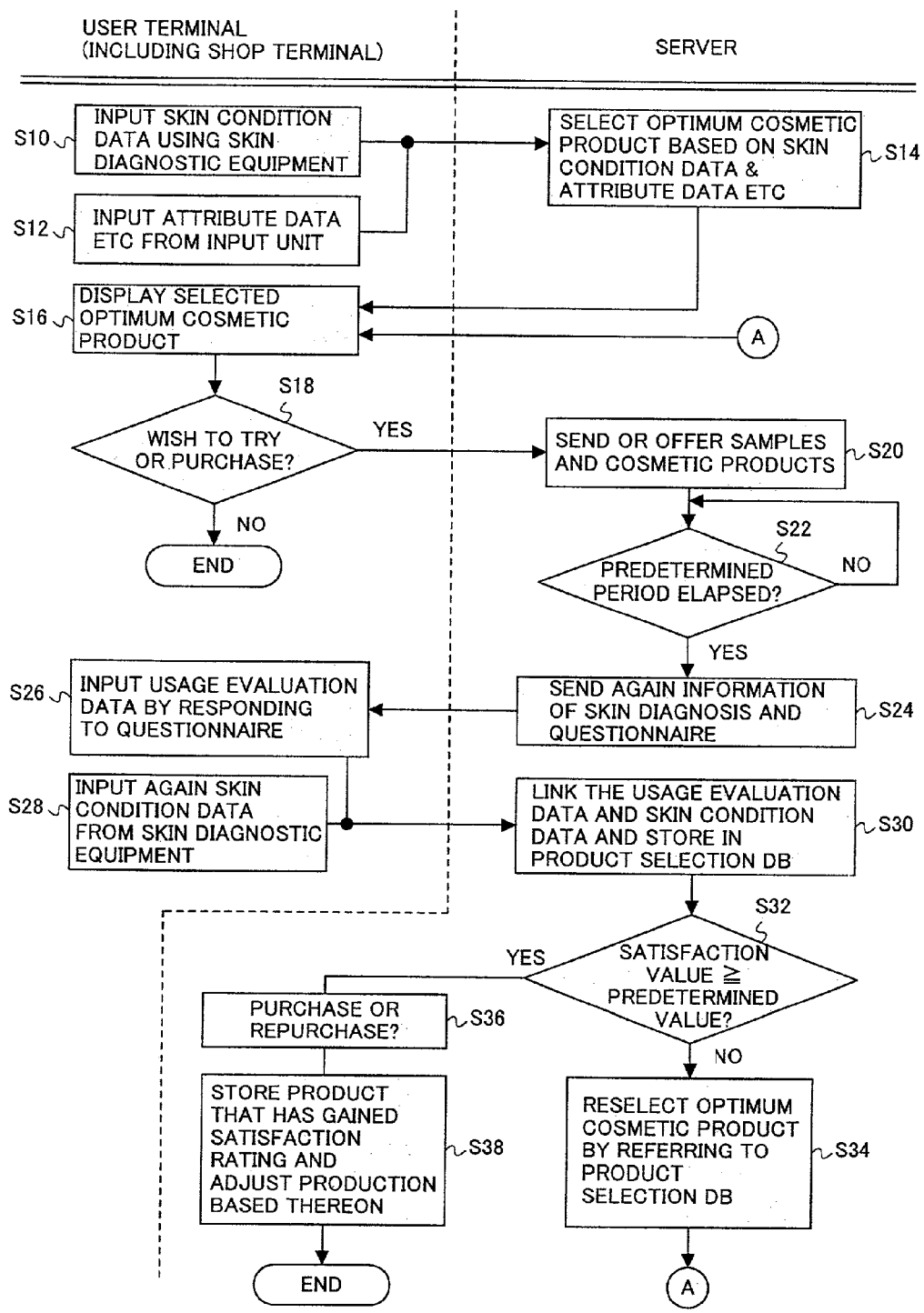
FIG. 2 is a flowchart showing a counseling process performed by the counseling system of an embodiment of the present invention.
Figure 3:
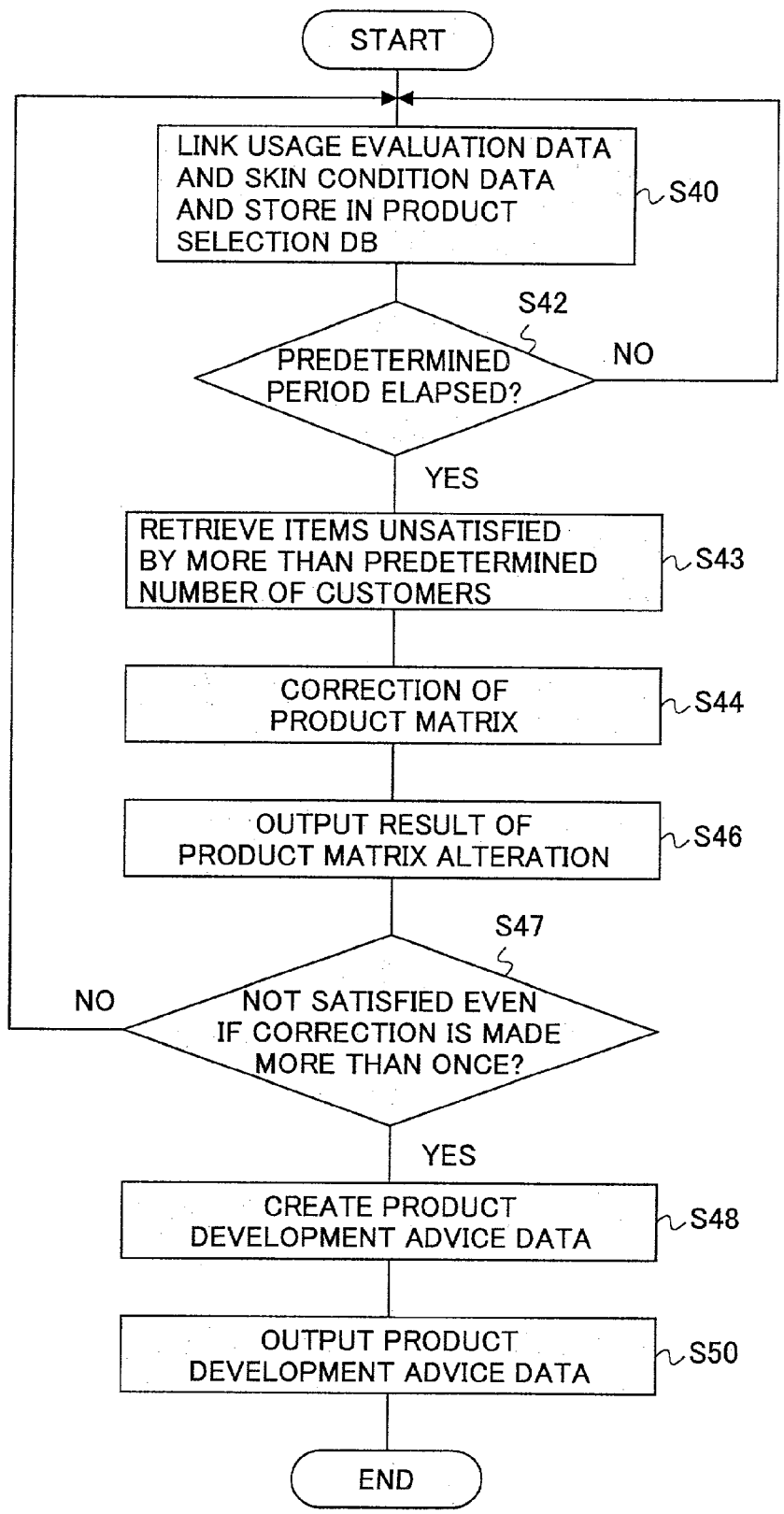
FIG. 3 is a flowchart showing a product development-assisting process performed by the counseling system of an embodiment of the present invention.

FIG. 2 is a flowchart showing a counseling process for carrying out cosmetic product counseling for the customer 12. Also, FIG. 3 is a flowchart showing a product development-assisting process for generating product development-assisting data based on the skin condition data and the usage evaluation data collected by the counseling process shown in FIG. 2. First, the counseling process shown in FIG. 2 will be described.

When the counseling process is initiated, the customer 12 uses the skin diagnostic equipment 15 connected to the user terminal 11 to acquire an image of a part of the skin on which cosmetic products are to be used and enters skin condition items in step 10 (in the figure, "step" is abbreviated as "S"). Thus, the skin diagnostic equipment 15 generates skin condition data of the imaged portion of the skin.

The customer 12 also carries out an input process of attribute data via the input unit 16 (step 12). FIG. 4 shows an example of a screen displayed on the display unit 18 while carrying out an input process of the attributed data. The customer 12 enters information for specified items on an attribute input screen displayed on the display unit 18 and the attribute data are input.

The skin condition data input in step 10 and the attribute data input in step 12 are transmitted to the central processing unit 26 of the server 20 via the transmitter/receiver unit 17, the Internet 13 and the transmitter/receiver unit 21.

When the skin condition data and the attribute data are transmitted from the user terminal 11 to the server 20, the central processing unit 26 refers to the initial product matrix stored in the product selection DB 23 to carry out a process of selecting a product that matches the transmitted attribute data (step 14. N.B. this process corresponds to the first selection means described in the claims).

As has been described above, when the counseling system 10 is used for the first time, there is no existing selected cosmetic product. Therefore, the server 20 carries out a process of selecting a cosmetic product suited to the customer 12 (optimum cosmetic product) based on the attribute data input in step 12.

Data related to the cosmetic product selected in step 14 is transmitted to the user terminal 11 via the transmitter/receiver unit 21, the Internet 13 and the transmitter/receiver unit 17 and is displayed on the display unit 18 (step 16). The customer 12 views the optimum cosmetic product displayed on the display unit 18 and decides whether to try it, purchase it or not to try or purchase it and inputs the decision by means of the input unit 16 (step 18). In a case where the customer 12 does not wish to try or purchase the optimum cosmetic product, the process of the present embodiment terminates.

On the other hand, if it is determined in step 18 that the customer 12 wishes to try or purchase the optimum cosmetic product, a process of sending the optimum cosmetic product is performed (step 20). The detailed sending process of the optimum cosmetic product is described below.

That is, when information indicating that the customer 12 wishes to try or purchase the optimum cosmetic product is transmitted from the user terminal 11, the server 20 sends this information to the manufacturer terminal 30 where this information is displayed on the display unit 34. Thus, the manufacturer is informed that the customer 12 wishes to try or purchase the optimum cosmetic product. Then, the manufacturer connects the manufacturer terminal 30 to the server 20, retrieves the address of the customer 12 wishing to try or purchase the optimum cosmetic product from the attribute DB 22 and sends the optimum cosmetic product or its sample to the customer 12.

When the process of step 20 of sending the optimum cosmetic products or its sample to the customer 12 is terminated, the server 20 waits until a predetermined period of time elapses in step 22. The predetermined period of time is a period from a point where the customer 12 starts using the optimum cosmetic product or its sample to a point where the effect of the cosmetic become visible on the skin.

If it is determined in step 22 that the predetermined period of time has elapsed, the central processing unit 26 sends a request to carry out a skin diagnosis again and also sends a questionnaire to the user terminal 11 (step 24). The questionnaire to be sent to the user terminal 11 is stored in the questionnaire DB 25.

When the above-mentioned request and questionnaire are sent to the user terminal 11, the customer 12 responds to the questionnaire in step 26. FIG. 5 shows an example of a questionnaire response screen. As shown in FIG. 5, the content of the questionnaire relates to the usage evaluation such as "viscosity when some amount is taken on hand", "absorption into skin" and "sliminess when applied to skin" that may be obtained when the selected cosmetic is used.

That is, according to the present embodiment, an input process of the usage evaluation data is carried out as the customer 12 responds to the questionnaire. Also, the questionnaire is prepared such that the customer 12 scores his/her satisfaction ratings on a five-grade scale for each question.

According to such a method in which the usage evaluation data is generated when the customer 12 responds to the questionnaire, it is easier for the customer 12 to answer the questions and it is convenient for the manufacturer to create usage evaluation data to be used by the manufacturer since a process of counting the results of the questionnaires is simplified with the contents of the questionnaires being common for all customers 12 and the satisfaction ratings are answered on a five-grade scale.

In addition to the process of the above-mentioned step 26, the customer 12 uses the skin diagnostic equipment 15 to acquire an image of a portion of skin whereon the selected cosmetic product has been used and/or to measure the skin condition so as to reenter the skin condition data after using the cosmetic product (hereinafter referred to as result skin condition data) (step 28). The usage evaluation data input in step 26 and the result skin condition data input in step 28 are transmitted to the server 20.

When the use evaluation data and the result skin condition data are transmitted from the user terminal 11, the central processing unit 26 links (or associates) the usage evaluation data and the result skin condition data and stores them in the product selection DB 23 (step 30).

Then, the central processing unit 26 determines whether the satisfaction rating of the customer 12 for the selected cosmetic selected in step 14 is greater than or equal to a predetermined value (step 32). The satisfaction rating can be obtained by numerically expressing the usage evaluation data, for example.

This will be described in detail for the present embodiment in which the satisfaction rating is expressed on a five-grade scale (grades of evaluation is not limited to five and may also be a seven-grade evaluation). Referring to question item 1 of the questionnaire shown in FIG. 5, the feel of the cosmetic on hand is scaled as five points for "GOOD", four points for "SLIGHTLY GOOD", three points for "NO CHANGE", two points for "SLIGHTLY BAD" and one point for "BAD". The satisfaction rating can be derived by obtaining the points for each question and adding the obtained points. Also, the predetermined value of the satisfaction rating score to determine in step 32 whether the customer 12 is satisfied with the selected cosmetic product is predetermined for each cosmetic product.

If it is determined in step 32 that the satisfaction rating of the user 12 is less than the predetermined value, the central processing unit 26 refers to the product matrix of the product selection DB 23 using the usage evaluation data and the result skin condition data transmitted from the user terminal 11 and reselects the optimum cosmetic product that suits the customer 12 (step 34. N.B. this process corresponds to the second selection means described in the claims.)

When the optimum cosmetic product is selected, the process returns to step 16 and the processes of the above-mentioned steps 16-32 are repeated. The reselection process is repeated until a positive result is obtained in step 32, that is, the satisfaction rating of the customer 12 for the selected cosmetic product becomes greater than or equal to the predetermined value. Then, if it is determined in step 32 that the satisfaction rating of the customer 12 for the selected cosmetic is greater than or equal to the predetermined value, the process proceeds to step 36 where the customer carries out a process for purchasing or repurchasing the product.

In the following step 38, based on the result of the process of step 32, the information of the cosmetic product that gives satisfaction to the user is stored in the production adjustment DB 27. At the same time, the number of customers for whom satisfaction rating exceeding the predetermined value for each cosmetic product is derived and this number of customers is also stored in the production adjustment DB 27.

In this storing step, not only the cosmetic product with a high satisfaction rating can be stored, but also the attributes of the customer 12 who has determined the relevant cosmetic product as satisfactory can be stored together. Then, production adjustment of the cosmetic is carried out based on the result of data accumulation of cosmetic data related to the obtained satisfaction rating (this data is referred to as production adjustment data). That is, based on the production adjustment data, among the presently produced cosmetic products, production of those cosmetic products having higher satisfaction rating can be increased and production of those cosmetic products having lower satisfaction ratings can be decreased. Thus, cosmetic products can be produced in a more efficient manner while optimizing inventory adjustment. Accordingly, production can be reduced for unpopular cosmetic products and increased for popular cosmetic products, so as to achieve efficient supply of cosmetic products on the market and optimization of inventory adjustment.

As has been described, according to the present embodiment, if it is determined in step 32 that the satisfaction rating of the customer 12 is less than the predetermined value, a reselection process is performed to select a product that matches the request of the customer 12. Also, such reselection process of a product is carried out based on the usage evaluation data input in step 26 and the result skin condition data input in step 28. Therefore, it is possible to correctly and easily give counseling for selecting cosmetic products that satisfy the customer 12. Also, as has been described above, it is possible to carry out production adjustment of the currently produced cosmetic products based on the obtained satisfaction ratings.

In the following, a product development-assisting process will be described with reference to FIG. 3.

The product development-assisting process is a process for generating product development-assisting data based on the skin condition data and usage evaluation data that are collected in the counseling process described with reference to FIG. 2. The product development-assisting process is implemented in the server 20 and the result thereof is transmitted to the manufacturer terminal 30.

The process of step 40 is the same as the process in step 30 of the counseling process shown in FIG. 2. That is, in step 40, the usage evaluation data and the result skin condition data that are input by the customer 12 are stored in the product selection DB 23 (corresponds to the storage means described in the claims) in a mutually linked manner. The product development-assisting process of the present embodiment implements the product development-assisting process based on the usage evaluation data and the result skin condition data stored in the product selection DB 23.

In step 42, the process waits for a predetermined period of time to elapse. In detail, it is determined whether number of data records (N) of the usage evaluation data and the result skin condition data transmitted from the customers 12 and stored in the product selection DB 23 is greater than or equal to a predetermined value.

If it is determined in step 42 that the number of data (N) is greater than or equal to the predetermined value, the process proceeds to step 43. In step 43, items unsatisfied for more than a predetermined number of customers are retrieved. The retrieved unsatisfied items are obtained by retrieving unsatisfied items of selected cosmetic products that do not have a satisfaction rating from more than a predetermined number of customers 12. This unsatisfaction item data is stored in the production adjustment DB 27.

In step 44 (corresponds to correction means described in the claims), based on the stored usage evaluation data and the result skin condition data, a correction process of the product matrix stored in the product selection DB 23 is carried out. The correction process of the product matrix will be described with reference to FIGS. 6 and 8.

The product matrix shown in FIG. 6 is an example of the product matrix before the correction process. Therefore, before the correction process, in step 34 a of counseling process shown in FIG. 2, the optimum cosmetic product is reselected based on the product matrix shown in FIG. 6.

In detail, based on the result skin condition data of the customer, when the amount of moisture of the skin is in the range of 11-20 and the amount of sebum is in the range of 11-20, the central processing unit 26 selects lotion B from the product matrix shown in FIG. 6 and recommends this to the customer as an optimum cosmetic product.

Now assume, however, that as a result of the customer using this lotion B, the satisfaction rating of the customer obtained from the result skin condition data is very bad. Also, assume that this is not only a result for a single customer but there is a similar tendency for a plurality of customers (customers having an amount of moisture between 11-20 and an amount of sebum between 11-20).

On the other hand, if the result skin condition data of the customer shows that the amount of moisture of the skin is 21-30 and the amount of sebum is 11-20, there is no cosmetic product that matches the relevant conditions in the product matrix. Therefore, the cosmetic product that is close to these conditions is selected. Here, it is assumed that the central processing unit 26 selects cosmetic B (the amount of moisture of the skin 11-20 and the amount of sebum 11-20) that is adjacent the relevant condition.

As a result, it is assumed that after the customer has used this lotion B, the satisfaction rating of the customer obtained from the result skin condition data is very good. Also, it is assumed that this is not only a result for a single customer but there is a similar tendency for a plurality of customers (customers having an amount of moisture between 21-30 and an mount of sebum between 11-20).

When the above facts are known, the central processing unit 26 corrects the product matrix shown in FIG. 6 into the product matrix shown in FIG. 8. That is, lotion B that is defined in FIG. 6 as optimum when the amount of moisture of the skin is between 11-20 and the amount of sebum is between 11-20 is modified as shown in FIG. 8 such that it is optimum when the amount of moisture of the skin is between 21-30 and the amount of sebum is between 11-20. In this manner, the product matrix is modified into a product matrix that better matches the satisfaction rating of the customer.

It is to be noted that, in the above description, the product matrix with the parameters being the amount of moisture and the amount of sebum is taken as an example, but any product matrix having other items as its parameters can be corrected in a similar manner.

As has been described, as a result of the correction of the product matrix carried out in step 44, the satisfaction rating of the customer 12 can always be reflected in the product matrix, and therefore, cosmetic products that can obtain the satisfaction rating of the customer 12 can be selected in a more accurate manner. The accuracy of the product selection capability of the product matrix improves as the number of data record (N) increases. Therefore, a more accurate selection process of cosmetic products for the customer can be performed by increasing the number of data record (N).

When the product matrix is corrected in the manner described above, the result of correction is transmitted to the manufacturer terminal 30 in step 46 and then displayed on the display unit 34.

In the following step 48 (corresponding to the product development assist means described in the claims), a creation process of the product development-assisting data is performed. In step 48, based on the usage evaluation data and the result skin condition data stored in the product selection DB 23 as a result of the process of step 40 (step 30), a process of selecting cosmetic products having characteristics that are not reflected in the product matrix is performed. Here, "being not reflected in the product matrix" is understood to mean that even though there is a customer's need for such a cosmetic product, there is no product that meets such a need (in other words, there is no such cosmetic product that has new characteristics required for the cosmetic product).

Figure 9:
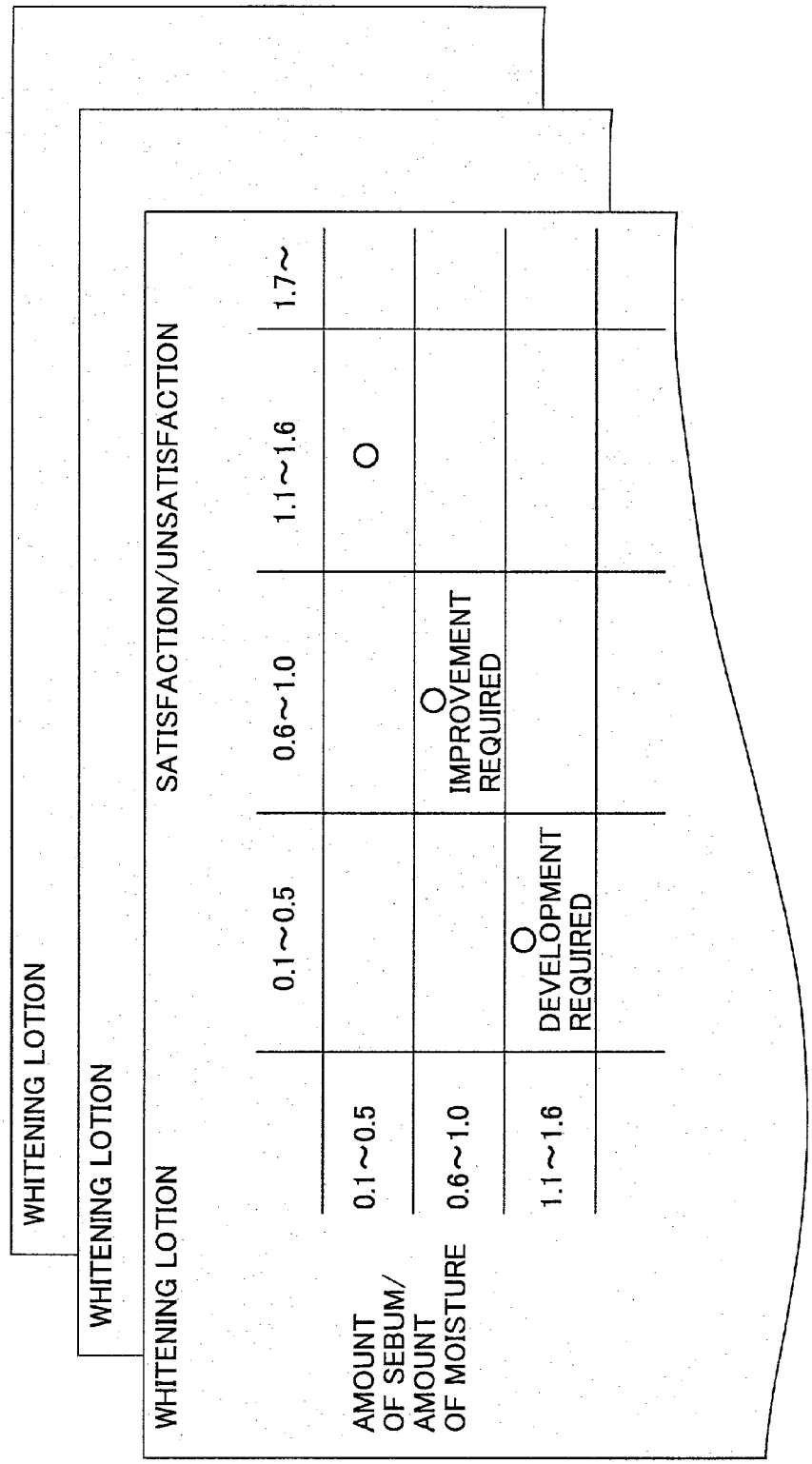
FIG. 9 is a diagram showing an example of an output of product development-assisting data.

This will be described with reference to FIG. 9. In FIG. 9, (amount of sebum/amount of moisture) is taken on the ordinate axis and (satisfaction rating/unsatisfaction rating) is taken on the abscissa axis. Therefore, referring to FIG. 9, it can be seen that, for example, for a case where the value of (amount of sebum/amount of moisture) is between 0.1-0.5, when the value of (satisfaction rating/unsatisfaction rating) exceeds 1.0, it can be determined that the setting of the (amount of sebum/amount of moisture) in the product matrix satisfies the customers 12 (satisfaction rating exceeds unsatisfaction rating).

Whereas, for a case where the value of (amount of sebum/amount of moisture) is between 0.6-1.0, the value of (satisfaction rating/unsatisfaction rating) is between 0.6-1.0, and therefore, the unsatisfaction rating exceeds the satisfaction rating. In such a case, the relevant cosmetic product does not satisfy the customers 12 and therefore it is necessary to give some improvement to the product.

On the other hand, for a case where the value of (amount of sebum/amount of moisture) is between 1.1-1.6, the value of (satisfaction rating exceeds unsatisfaction rating) is between 0.1-0.5. Here, it is assumed that the cosmetic product having the value of (amount of sebum/amount of moisture) between 0.6-1.0 is not actually produced as a product. That is to say, a cosmetic product having a characteristic having a value of (amount of sebum/amount of moisture) between 0.6-1.0 is not reflected in the matrix.

Accordingly, values of (satisfaction rating/unsatisfaction rating) should not exist for those products that are not reflected in the product matrix (those with no product). However, the reason why the customer 12 expresses reactions on (satisfaction rating/unsatisfaction rating) for the characteristics that do not exist is because the customer 12 is unsatisfied with the fact that even though he/she wishes for a product having the relevant characteristics, such a product does not exist.

This is equivalent to the customer 12 wishing for a cosmetic product with the value of (amount of sebum/amount of moisture) between 1.1-1.6 to be available on market. In this manner, what is shown in FIG. 9 can be used as product development-assisting information for performing product development.

Further, in step 48, retrieval of functions (including usability) of cosmetic products to be improved or developed and retrieval of demand forecast (productivity requested in the market, etc.) are performed based on the usage evaluation data, result skin condition data and unsatisfaction item data.

As has been described, when the product development information shown in FIG. 9, the product functions to be improved and the demand forecast are generated in step 48, the product development-assisting information is transmitted to the manufacturer terminal 30 and is displayed on the display unit 34 thereof (step 50). The manufacturer uses this product development-assisting information as background material for developing new products. It is to be noted that after the process of step 50, the product development-assisting process of the present embodiment is terminated.

As has been described above, in accordance with the product development-assisting process of the present embodiment, product development-assisting information that matches the needs of the customer 12 is produced. Using this product development assist information as background material, the manufacturer that carries out product development of cosmetic products can readily and accurately develop new products that match the needs of the customers 12 or in other words that satisfy the customer 12.

The product counseling system in accordance with the embodiment of the present invention described above is not limited to examples described herein and the system may be realized such that parts of the system excluding hardware parts can be constructed as a software (program) for realizing equivalent functions and stored on a medium such as a disk device that can be installed into a computer as required or downloaded into a computer via a network. Further, the constructed program can be stored in a portable recording medium such as a floppy (registered trade mark) disk, a memory card and a CD-ROM and generally used where such a system is to be used.

It is to be noted that in the embodiment described above, the example in which the present invention is applied is counseling and product development of cosmetic products, however, the application of the present invention is not limited to cosmetic products but may also be applied to various products other than cosmetic products (for example, food, medicine).

What is claimed is:

1. A device for selecting a skin care product comprising:
a first computer, operatively coupled to diagnostic equipment that contacts a person's skin and which outputs electrical signals that represent physical characteristics of the skin, said first computer selecting a product suited for a user based on data representing the person's skin condition before a product is selected;
a storage device operatively coupled to the first computer and which stores skin condition data and which also stores usage evaluation data obtained from said person after using a selected product;
a display device coupled to the computer; and
a second computer, which develops a new product having new characteristics required for a person based on condition data and product usage evaluation data stored in said storage device;
said second computer organizing products in the form of a product matrix such that a product name is specified by a combination of at least a value range of a first attribute representing a skin state of human beings and represented in rows and a value range of a second attribute representing a skin state of human beings and represented in columns;
said first attribute being divided into a plurality of intervals representing respective, mutually different value ranges for said first attribute,
said second attribute being divided into a plurality of intervals representing respective, mutually different value ranges for said second attribute.

2. A product counseling system comprising:
a terminal having a first computer, and diagnostic equipment coupled to the first computer, the diagnostic equipment contacting a users skin and providing electrical signals to the first computer, which represent the users skin condition, the terminal being capable of transmitting skin condition data to a server over a network; and
a server operatively coupled to the terminal via a network, said server receiving skin condition data from the first computer and generating counseling data of products suited for said customer based on skin condition data obtained from said terminal, said server transmitting said counseling data to said terminal,
said server comprising:
a skin care product database, from which at least one skin care product is selected as being suited for said customer based on skin condition data before a product selection is made;
the skin care product database storing product matrices, which link values of each item constituting said condition data and product characteristics of said products,
said product matrices including a first matrix for use in an initial session of product counseling and a second matrix for use in a second or later session of product counseling, said second matrix being different from said first matrix, said first matrix organizing products forming a product group such that a product of said product group is specified by a first combination of at least a value range of a first attribute representing a skin state of human beings and represented in rows and a value range of a second attribute representing a skin state of human beings and represented in columns, said second matrix organizing said products of said product group such that a product name is specified by a second combination of said first attribute represented in rows and said second attribute represented in columns, said first attribute being divided into a plurality of intervals representing respective. mutually different value ranges for said first attribute, said second attribute being divided into a plurality of intervals representing respective, mutually different value ranges for said second attribute; and a correction part for correcting said product matrices based upon said condition data and usage evaluation data of said products provided by said customer via said terminal, said product selection part selecting said product by referring to said product selection database.

3. The product counseling system as claimed in claim 2, wherein said condition data and said usage evaluation data are stored in a storage part and wherein said correction part corrects said product matrices when a number of said correction data and usage evaluation data in said storage part has exceeded a predetermined number.

4. The product counseling system as claimed in claim 2, wherein said product matrices include a first product matrix for use in an initial session of product counseling and a second product matrix for use in a second or later session of product counseling, said second product matrix being different from said first product matrix.

* * * * *